United States Patent Office 3,275,580
Patented Sept. 27, 1966

3,275,580
SHAPED ARTICLES CONTAINING CELLULOSE CRYSTALLITE AGGREGATES HAVING AN AVERAGE LEVEL-OFF D.P.
Orlando A. Battista, Drexel Hill, Pa., assignor, by mesne assignments, to FMC Corporation, San Jose, Calif., a corporation of Delaware
No Drawing. Filed Jan. 31, 1963, Ser. No. 255,211
6 Claims. (Cl. 260—17.4)

This case is a continuation-in-part of application Serial Number 113,660, filed May 31, 1961, and abandoned.

This invention relates to new articles of manufacture. More particularly it relates to shaped articles including films, sheets and filaments of a polymeric material incorporating varying proportions of cellulose crystallite aggregates having a average level-off degree of polymerization.

It is an object of this invention to provide shaped articles of cellulosic material having improved characteristics and properties.

It is another object of this invention to provide cellulosic filaments having improved properties and characteristics.

It is another object of this invention to provide regenerated cellulose filaments having improved properties and characteristics.

It is another object of this invention to provide cellulosic films having improved properties and characteristics.

It is another object of this invention to provide regenerated cellulose films having improved properties and characteristics.

These and other objects which will be apparent from the following description, are accomplished in accordance with the present invention which broadly stated is a shaped article comprising a cellulosic material, and cellulose crystallite aggregates having an average level-off degree of polymerization (D.P.).

The cellulosic material preferably includes regenerated cellulose, cellulose ethers, for example, methyl cellulose, ethyl cellulose, hydroxymethyl cellulose, hydroxyethyl cellulose, hydroxypropyl cellulose, etc.; and cellulose esters, for example, cellulose nitrate, cellulose propionate, cellulose acetate, etc.

The cellulose crystallite aggregates are products obtained by the controlled hydrolysis of cellulose, there being formed an acid-soluble portion and an acid-insoluble portion. The latter comprises a crystalline residue or remainder which is washed and recovered, being referred to as cellulose crystallite aggregates, or as level-off D.P. cellulose.

In the hydrolysis of cellulose, the amorphous portions of the original cellulose chains are dissolved, the undissolved portions being in a particulate, non-fibrous or crystalline form as a result of the disruption of the continuity of the fine structures between crystalline and amorphous regions of the original cellulose. Although hydrolysis may be effected by various specific methods, including the use of various acids and enzymes, a direct method which is free of secondary reactions comprises the treatment of the original cellulosic material with 2.5 normal hydrochloric acid solution for 15 minutes at boiling temperature. Another suitable method comprises treating the cellulosic material with 0.5% hydrochloric acid solution (0.14 normal) at 250° F. for 1 hour. The cellulose undergoing such treatment reaches, within the time period noted, a substantially constant molecular weight, or in other words, the number of repeating units or monomers, sometimes designated anhydroglucose units, which make up the cellulosic material, becomes relatively constant, from which it is apparent that the degree of polymerization of the material has leveled off, hence the name level-off D.P. cellulose. In other words, if the hydrolysis reaction were continued beyond the period noted, the D.P. would change very little if at all. In all cases, the level-off D.P. value reflects the fact that destruction of the fibrous structure has occurred as a result of the substantially complete removal of the amorphous regions of the original cellulose.

The cellulose crystallite aggregates, or level-off D.P. cellulose, in accordance with the present invention have average level-off degrees of polymerization ranging from 15 to 375 and preferably from 30 to 300 anhydroglucose units. The degree of polymerization or D.P. is measured and determined by the procedure set forth in "Fundamentals of High Polymers" by O. A. Battista, Reinhold Publishing Corp., New York City, 1958, pages 74 through 80, 106 and 107.

The aggregates resulting from the hydrolysis and washing steps are further characterized by having a particle size in the range of 1 or 2 to 250 to 300 microns, as determined visibly by microscopic examination. By subjecting the foregoing product to a mechanical disintegration, as described below, there is produced a material having a size in the range of less than 1 to about 250 or 300 microns. Within this range, the particle size and size distribution are variable, it being understood that the size and size distribution can be selected to suit a particular end use. In general, mechanically disintegrated particles are preferred.

The source material for the crystallite aggregate may suitably be one or more natural fibers such as ramie, cotton, purified cotton, also bleached sulfite pulp, bleached sulfate wood pulp, etc. Particularly suitable are sulfite pulp which has an average level-off D.P. of 200 to 300, at least 90% of which has a D.P. in the range of 75 to 550; and also sulfate pulp which has an average level-off D.P. of 125 to 175, at least 90% of which is in the range of 50 to 350.

Other suitable cellulose crystallite aggregates may have lower average level-off D.P. values, say in the range of 60 to 125, or even 15 to 60.

In general, the cellulose source material has a D.P. greater than the level-off D.P. thereof.

Mechanical disintegration of the aggregates, as referred to above, may be carried out in several ways, as by subjecting them to attrition in a mill, or to a high speed cutting action, or to the action of high pressures on the order of at least 5,000 or 10,000 p.s.i. The disintegration of the aggregates is carried out in the presence of a liquid medium, although where high pressure alone is employed, such medium, although desirable, is not necessary. Water is a preferred medium, but other preferably edible liquids are suitable, including sugar solutions, polyols, of which glycerol is an example, alcohols, particularly ethanol, and the like. Whatever method is used, the disintegration is carried out to such an extent that the resulting disintegrated aggregates are characterized by forming a stable suspension in the aqueous medium in which they are being attrited, or in which they may be subsequently dispersed. By a stable suspension is meant one from which the aggregates will not settle out but will remain suspended indefinitely, even for periods measured in terms of weeks or months. The disintegrated aggregates are further characterized by the fact that such suspension forms an extremely adherent film when deposited on a glass panel or sheet or other suitable surface. At lower concentrations of aggregates, the suspension is a dispersion, while at higher concentrations it is a gel. It will be understood in this connection, that for the purposes of this invention the term suspension includes both a dispersion and a gel; the latter expressions being defined below.

The preferred disintegration method is to attrite the aggregates by means of a high speed cutting action in the presence of an aqueous medium. The aggregates may be in a dry or never-dried state prior to attrition, although some water should be present during the cutting or shearing of the particles. If they are initially in the never-dried or wet state, that is, as received from the water washing step, they have a moisture content of at least 40% by weight, and it is possible to attrite them without further addition of water, although water may be added if desired. In any event, it is preferred that the water content of the mixture undergoing attrition should be at least 10 to 15 to 20% by weight. The aggregates content of the mixture to be attrited is preferably at least 3% by weight, and desirably is higher as the efficiency of the cutting action increases with the aggregates content.

Suitable consistencies are those of mixtures containing up to about 35% by weight of aggregates and the balance water; such mixtures lend themselves well to good attrition and are convenient to handle both during and after the disintegration; they also have the advantage of directly producing a gel. At consistencies above 35%, say from 35 to 70%, attrition produces a material which, in the lower end of this range, resembles mashed potatoes of relatively soft or mushy appearance, and as the concentration increases, the material acquires a progressively firmer and drier appearance and consistency; above 50% the material tends to become crumbly. Although the attrited products of consistencies above 35% are not gels, they have the distinctive property of forming indefinitely stable, smooth gels of varying thickness and striking appearance upon the addition of water and stirring manually, as with a spoon, for a few minutes. At about 80% consistency, attrition results in a damp but free flowing material comprising discrete grains or granules and clumps of grains; the moisture content is apparent to the touch rather than the eye; and the material forms a gel upon being manually stirred or beaten in water. At 80 to 90% consistency, the product of attrition is a crumbly, free flowing, grainy, dry-appearing material that does not have a damp feel and which requires energetic beating in the presence of water to form a gel.

Either before or after mechanical disintegration the aggregates may be dried. Where the disintegration is performed in the presence of an aqueous medium, drying is preferably carried out after the distintegration step. Drying may be done in any suitable vacuum, or in air at room temperature or higher, going up preferably to 60° C. to 80° C., although the temperature may be up to 100 or 105° C. or higher. Another procedure is to displace the water in the wet aggregates, preferably by means of a low boiling, water miscible organic compound such as a low molecular weight aliphatic alcohol like methanol, ethanol, propanol; isopropanol, etc., and then to evaporate off the compound. The resulting dried aggregates, as described below, tend to form stable dispersions and gels more readily. Spray drying either in air or in a vacuum is also satisfactory. Spray drying and also freeze drying and drum drying, are particularly effective to dry the aggregates after the disintegration step. Freeze drying in particular favors the development of a very porous material which is characterized by the presence therein of a multiplicity of pores or depressions of extremely small size; such material readily forms stable dispersions and gels.

Following the mechanical disintegration of the aggregates, the resulting product, whether a dispersion or gel, may be taken and used as such; or it may be de-watered and dried; or it may be desirable to fractionate it into fractions having a more uniform particle size and size distribution. If the product is a mixture containing 35 to 90% solids, it may be stirred in water to form a gel, and the latter is handled as indicated. The dried products are also redispersible in aqueous media by the help of agitation, such as provided by a Waring Blendor, to form dispersions and gels.

In respect of the drying of the gels, it should be observed, first of all, that the preferred gels are those obtained by attriting the never-dried hydrolysis product; these gels have very desirable qualities in respect of smoothness, mouth feel, firmness, storage characteristics, etc. They may be dried to any practical moisture content, in which state they are redispersible in water, by the aid of a suitable attrition step, to form a gel, and this latter gel may again be dried if desired and again redispersed to form a subsequent gel. Gels are also obtainable by attriting the dried hydrolysis product, and these gels may be dried and attrited to again form gels. For producing the dried products, a number of drying procedures are available, and while redispersible materials result from each procedure, some procedures are more advantageous than others, as indicated. For example, freeze drying, spray drying, drum drying, and drying by solvent displacement each produce a material which has an appreciably lower bulk density than conventionally ovendried materials, with freeze drying producing the lowest bulk density by far, viz., 9.8 lbs./cu. ft. as against 14.1 lbs./cu. ft. for oven-dried aggregates; and such procedure produces a material which is more easily redispersible in water, by the aid of an attrition step, to form a stable suspension than air or oven-dried materials. Freeze-dried, spray-dried, drum dried, and solvent displacement-dried materials are noticeably softer to the touch than products of the other drying steps; and freeze drying also produces a more porous product. With regard to the mouth feel of the various materials, those made by freeze drying, spray drying, and drum drying, are superior.

Fractionation of the attrited products may be accomplished by means of such separation procedures as mechanical sifting, settling in water, or centrifuging, a number of useful fractions being obtainable, including fractions having a particle size of up to 0.2, 1, 2, 5, or 10 microns. Still another desirable fraction is one whose dimensions are all below 100 microns, or below 40 or 50 microns; a fraction in the range of about 40 to 250 or 300 microns is of special interest because of the finding that particles in this size range, particularly those having one or two dimensions of up to 250 or 300 microns, tend to have cracks, fissures, notches, voids, depressions, pores, and the like in their surfaces. Preferably, each dimension of the particles should be within the size range noted for each fraction; however, particles having two dimensions within the size range are quite useful, as are particles having but one dimension within the the size range although they are less preferred.

The attrited cellulose crystallite aggregates and dispersions thereof prefered for use in the present invention are the claimed subject matter of U.S. Patent No. 2,978,446, issued April 4, 1961 to O. A. Battista and P. A. Smith.

Derivatives of the cellulose crystallite aggregates are also useful materials which may be incorporated in the cellulosic shaped articles of this invention. Oxidation derivatives including aldehyde derivatives, carboxyl derivatives and mixed aldehyde-carboxy derivatives may be used. Ether derivatives and ester derivatives of the crystallite aggregates have utility in the present invention. It is preferred, where the derivatized aggregates are to be incorporated in aqueous media that water-insoluble derivatives be used. However, if the aggregates are to be incorporated in organic solvent media containing dissolved polymer material the derivatized aggregates should be organic solvent-insoluble.

Generally speaking, the articles of manufacture of this invention are formed by incorporating less than about 90%, based on the weight of the article, of the cellulose crystallite aggregates or derivatives thereof into a solution of a cellulosic material prior to the formation of the shaped article and coagulation thereof. In the case of articles such as films, sheets and filaments manufactured from viscose, a flurry or gel of the crystallite aggregates may be injected into the viscose solution under pressure just prior to spinning or the aggregates may be incorporated into the viscose at the mixing stage wherein cellulose xanthate crumbs, caustic soda and water along with the desired amount of aggregates are thoroughly mixed and deaerated.

In general, filaments formed by the coagulation of solutions of cellulosic derivatives such as cellulose xanthate, cellulose ethers and cellulose esters exist as chains organized into comparatively large crystalline areas of sections interlaced with amorphous regions. It is known that great improvement can be obtained in the characteristics and properties of coagulated cellulosic filaments by the addition of small amounts of various chemical additives. The chemical additives assist in controlling the size and perfection of the crystalline regions, as well as the extent to which they can be oriented by stretching. Filaments with this modified structure generally have much improved dimensional stability and strength characteristics.

The cellulose crystallite aggregates of this invention are injected into filament forming viscose solutions prior to spinning in any preselected average particle size and range. It is theorized that the injected cellulose crystals act as seeds or minute nuclei which induce, in the coagulating viscose, the formation of crystal structures of similar size in uniformly spaced intervals. For the production of improved rayon tire cord, for example, amounts of the cellulose crystallite aggregates ranging up to 1.0% may be combined with the viscose.

For the purpose of spinning other types of viscose or cellulose derivative yarns, such as cloth or rug fabric yarns, amounts of cellulose crystallite aggregates ranging from as high as 10% may be used. In general, higher amounts of the smaller particle size aggregates are effectively incorporated in the shaped article while lesser amounts of the larger particle size aggregates should be used.

Incorporation of cellulose crystallite aggregates in filaments and fibers provides a variation of different characteristics and properties depending on the amount and particle size of the aggregates used. The fibers can be delustered or greater orientability of the filaments resulting in improved dimensional stability, is obtained.

In the case of films and sheets manufactured from cellulosic material the cellulose crystallite aggregates are preferably incorporated in amounts less than 50% by weight based on the finished article. For this purpose particle size of the aggregates can range up to about 250 microns. As in the case of filaments, the amount and particle size of the aggregates used will provide films and sheets of varying properties and characteristics. Generally, when incorporating aggregates of larger particle size, the amount which may be effectively incorporated will range up to about 30% of the shaped article. When finer particle size is used an amount up to 50% may be incorporated. For example, larger particle sizes and higher amounts up to about 30% will result in films having the appearance and properties of parchment paper, while amounts of from about 5 to 15% of the aggregates having a particle size of less than 10 microns and preferably under 1 micron will produce films of glassine or onion skin characteristics.

Another unexpected characteristic of fibers and sheets containing cellulose crystallite aggregates of fine particle size is the plasticizing effect obtained without the use of the usual plasticizing material such as glycerine; the nuclei appear to act as "hinges" within the fine structure of the polymeric product, thereby providing a unique form of internal plasticization.

Both fibers and films of the present invention have improved dyeing properties due to the more uniformly distributed direct dye receiving crystalline areas in and on the surface thereof.

Shaped articles such as molds, mold liners, etc. can be produced by shaping a mass of wet regenerated cellulose containing up to 90% of level-off D.P. cellulose into the desired shape and drying.

The following examples are set forth to demonstrate this invention.

*Example I*

An aqueous slurry containing 10% cellulose crystallite aggregates having an average level-off D.P. of 30, particle sizes ranging up to 20 microns and an average particle size of 1 micron in injected into a filament forming viscose solution just prior to extrusion at a rate sufficient to incorporate 0.3% by weight of the crystallite aggregate in the regenerated cellulose. The mixture is extruded through a spinneret into a coagulating bath to form a 200 denier, 100 filament yarn at a rate of 40 meters per minute.

The viscose used contains about 7.4% cellulose, about 6.6% caustic soda and has a carbon disulfide content of about 36%, based on the weight of the cellulose. The viscose is aged to a common salt test index of 9.4. This viscose is spun in a coagulating bath containing 7.6% sulfuric acid, 5% zinc sulfate and 17% sodium sulfate, and maintained at a temperature of 60° C. The yarn is then passed through a hot-water bath at 95° C. and then stretched about 80%. The yarn is collected in a spinning box, washed free of acids and salts and dried.

*Example II*

An aqueous slurry containing 20% cellulose crystallite aggregates having an average level-off D.P. of 220, particle sizes ranging up to 2 microns and an average particle size of 0.5 micron is injected into a filament forming viscose solution just prior to extrusion at a rate sufficient to incorporate 7% by weight of the crystallite aggregate in the regenerated cellulose. The mixture is extruded through a 600 hole spinneret having 3 mil holes and drawn through the spinning bath at 60 meters per minute. The spinning bath is maintained at 45° C. and contained 9% sulfuric acid, 1% zinc sulfate and 20% sodium sulfate.

The viscose used is a cotton pulp viscose having 8% by weight of sodium hydroxide, 7.5% cellulose, 40% carbon disulfide, based on the weight of the cellulose, and a common salt test index of 5.5.

After leaving the spin bath, the filaments are passed over a succession of godets which effect a total stretch of 85% of the original length of the filaments. The filaments are then cut in short lengths and dropped into hot water in relaxed state. On drying the staple fibers are delustered, highly crimped yarn.

*Example III*

An aqueous slurry containing 40% cellulose having an average level-off D.P. of 220 with particle sizes of up to 250 microns and an average particle size of about 40 microns was injected into a viscose solution just prior to extrusion thereof at a rate sufficient to incorporate 15% of the aggregates in the regenerated cellulose article. The viscose contained 8% cellulose, 6% sodium hydroxide, 30% carbon disulfide, based on the weight of the cellulose, and had a common salt test index of about 2.

The mixture was extruded through a 5 mil by 8 inch slot into an aqueous cogulating bath containing about 9% sulfuric acid and 20% sodium sulfate. The film was then successively treated to be desulfurized, bleached, washed and dried.

The product was a translucent, flexible sheet very similar to parchment and is especially useful as a release sheet in the molding of translucent plastic sheets. Flexibility of this product was obtained even in the absence of a conventional plasticizer such as glycerine.

*Example IV*

An aqueous slurry containing 30% cellulose crystallite aggregates having an average level-off D.P. of 125 with particle sizes ranging up to 2 microns and an average particle size of less than 1 micron was injected into a viscose solution just prior to extrusion thereof at a rate sufficient to incorporate 10% of the aggregates in the regenerated cellulose article. The viscose contained 8% cellulose, 6% sodium hydroxide, 30% carbon disulfide based on the weight of the cellulose, and had a common salt test index of about 2.

The mixture was extruded through a 5 mil by 8 inch slot into a coagulating bath containing about 9% sulfuric acid and 20% sodium sulfate. The film was then passed through successive baths to be desulfurized, bleached, washed and dried.

The product had a glassine finish and was similar in appearance to onion skin paper. It was flexible without the incorporation of any extraneous plasticizing agent.

*Example V*

A thixotropic gel comprising 10% of cellulose crystallite aggregates having an average level-off D.P. of about 60 with particle sizes ranging up to 0.2 micron in an aqueous medium is injected into the viscose stream just prior to extrusion at a rate sufficient to incorporate about 30% of the aggregate material in the regenerated cellulose article. The viscose, as described in Example IV, and the aggregates are extruded through a 5 mil by 8 inch slot into a coagulating bath containing about 9% sulfuric acid and about 20% sodium sulfate. The film is then successively treated to be desulfurized, bleached, washed and dried.

The product is a clear, plasticized film having improved dimensional stability and suitable for food and meat wrapping or the like.

In accordance with this invention shaped articles such as films and filaments are formed of a mixture of a filament and film-forming thermoplastic resin and cellulose crystallite aggregates having an average level-off D.P.

The filament and film-forming thermoplastic resins include, for example, olefin polymers and copolymers wherein the olefin has from 2 to 6 carbon atoms including polyethylene, polypropylene and polyisobutylene halogenated olefins and the like; vinyl polymers and copolymers including polymers of vinyl halides, vinyl esters of fatty acids, vinylidene halides, styrene, styrene-butadiene, and the like; acrylic polymers and copolymers including polymers of acids of the acrylic series, esters of the acrylic series, acrylonitrile, acrylamide and the like; polyesters including polymers of aliphatic acids and aliphatic glycols, aromatic acids and aliphatic glycols, mixtures of various acids and various glycols, and the like; polycarbonates including polymers of dimonohydroxy arylene alkanes, for example, bisphenol A; and polyamides including the polymers of monoaminomonocarboxylic acid, the product of diamines and dibasic carboxylic acid, and the like.

The filament and film-forming resins are mixed with the cellulose crystallite aggregate material in about the proportions specified for mixtures with cellulose for the production of cellulose films and fibers. Thus, films of the synthetic resins contain up to 50% of the crystallite aggregates where the particle size averages less than about 10 microns while aggregates averaging up to about 250 microns are incorporated in the film in amounts up to about 30% based on the weight of the film. Preferably, for synthetic resin films and filaments, crystallite aggregates having an average particle size of less than 1 micron are used in amounts up to about 10% based on the weight of the article.

The incorporation of cellulose crystallite aggregates as described herein in synthetic resin filaments and films provides certain advantages including improved dyeability, reduction in electrostatic pick-up, plasticization of the article, etc.

Films and coatings of the mixture of synthetic resin and cellulose crystallite aggregates are prepared by extrusion, and by casting of solvent solutions or aqueous dispersions thereof. Filaments are formed by extrusion of melts or organic solutions of the resins. Care must be taken in melt extrusion techniques not to use the temperatures which will degrade the cellulose crystals. Methods for the preparation of filaments and films are so well known as to preclude the need for further elaboration.

*Example VI*

Cellulose crystallite aggregates having an average particle size of about 5 microns are spread uniformly on a 1 mil thick sheet of high density linear polyethylene in an amount of 5% based on the weight of the film. The polyethylene film is then placed between two sheets of coextensive raw cellophane and the sheets placed between electrically heated plates under slight pressure. The temperature is maintained at 200° C. for 1 minute and then the sheet is removed and the cellophane lamina peeled off. This sheet has microcrystalline cellulose particles embedded uniformly within it and may be dyed with direct dyes to produce a uniform color.

*Example VII*

A lacquer solution is prepared comprising 15% by weight of a resinous terpolymer of 82.5% by weight of vinyl chloride, 15.8% vinyl acetate and 1.7% maleic acid; 2% by weight of cellulose crystallite aggregates having an average particle size of about 10 microns, 42% by weight of toluene and 41% by weight of methyl isobutyl ketone. This lacquer is sprayed on a cellophane sheet and dried. The composite film has a frosty translucent appearance.

*Example VIII*

A 25% solution of polyhexamethylene adipamide in phenol is prepared. A 35% aqueous dispersion of cellulose crystallite aggregates having an average particle size of about 1 micron is mixed in said solution to produce a weight ratio of polyamide to crystallite of 25 to 1. This solution is spun through a spinneret immersed in the spin bath and having 40 orifices of 4 mils diameter, into a spin bath consisting of a 4% aqueous sodium hydroxide at 75° C. The filaments are cold drawn from the bath to produce a stretch of about 200%. The polyamide fiber is washed and then run through a direct color dye bath.

*Example IX*

About 1.0% by weight of cellulose crystallite aggregates having particle sizes all less than 0.2 micron is blended with pellets of film-forming isotactic polypropylene. The blend is melt extruded through a slot to form a film of about 1 mil in thickness and then equally biaxially stretched to produce a clear, internally plasticized film.

Various changes and modifications may be made practicing the invention without departing from the spirit and scope thereof and, therefore, the invention is not to be limited except as defined in the appended claims.

I claim:

1. A shaped article of a mixture of filament and film-forming synthetic thermoplastic resin and less than 50% by weight of the mixture of cellulose crystallite aggregates having an average level-off D.P. of from 15 to 375.

2. A film of a mixture of a film-forming synthetic thermoplastic resin and cellulose crystallite aggregates having a level-off D.P. of from 15 to 375, said aggregates being present in an amount of up to 50% by weight of the mixture when the average particle size of the aggregates averages less than about 10 microns and said aggregates being present in an amount up to about 30% by weight when the particle size of the aggregates averages up to about 250 microns.

3. The film of claim 2 wherein the cellulose crystallite aggregates are present in an amount of up to about 10% by weight and the average particle size of the aggregates is less than about 1 micron.

4. A filament of a mixture of filament-forming synthetic thermoplastic resin and cellulose crystallite aggregates having a level-off D.P. of from 15 to 375, said aggregates being present in an amount up to about 10% by weight and having an average particle size of less than 1 micron.

5. The shaped article of claim 1 wherein the thermoplastic resin is a polyolefin.

6. A composite sheet comprising a flexible base sheet and a coating thereon comprising a mixture of a film-forming synthetic thermoplastic resin and cellulose crystallite aggregates having a level-off D.P. of from 15 to 375 in an amount of less than 50% based on the weight of the coating.

References Cited by the Examiner

FOREIGN PATENTS 402,383  2/1932  Great Britain.

WILLIAM H. SHORT, *Primary Examiner.*

J. NORRIS, *Assistant Examiner.*